No. 844,223. PATENTED FEB. 12, 1907.
K. WIESER.
FUSE HOUSING.
APPLICATION FILED JULY 31, 1906.

Witnesses
H. H. Totten
M. E. Tucker

Inventor,
Karl Wieser
By Knight Bros.
Attorneys

UNITED STATES PATENT OFFICE.

KARL WIESER, OF ESSEN-RÜTTENSCHEID, GERMANY, ASSIGNOR TO FRIED. KRUPP AKTIENGESELLSCHAFT, OF ESSEN-ON-THE-RUHR, GERMANY.

FUSE-HOUSING.

No. 844,223.      Specification of Letters Patent.      Patented Feb. 12, 1907.

Application filed July 31, 1906. Serial No. 328,561.

*To all whom it may concern:*

Be it known that I, KARL WIESER, a subject of the Emperor of Germany, and a resident of Essen-Rüttenscheid, Germany, have invented certain new and useful Improvements in Fuse-Housings, of which the following is a specification.

The present invention relates to those fuse-housings which are provided with a rotatable timing-cap held to the fuse-body by means of screws, such housing being in particular used for mechanical time-fuses.

The object of the invention is to improve the connection between the timing-cap and the fuse-body in such a manner that when the holding-screws are tightened their pressure is distributed over a great surface, thereby preventing the timing-cap packing or permanently binding against the fuse-body.

In the accompanying drawings one embodiment of the invention is shown by way of example.

Figure 1:
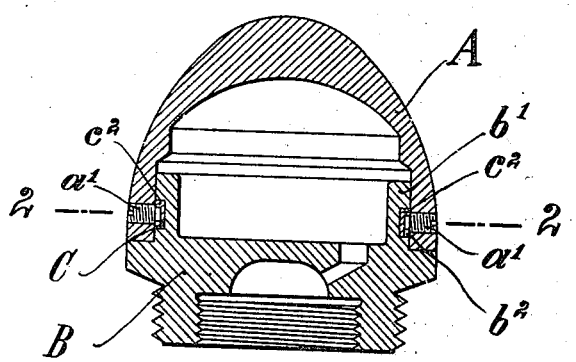
Figure 2:
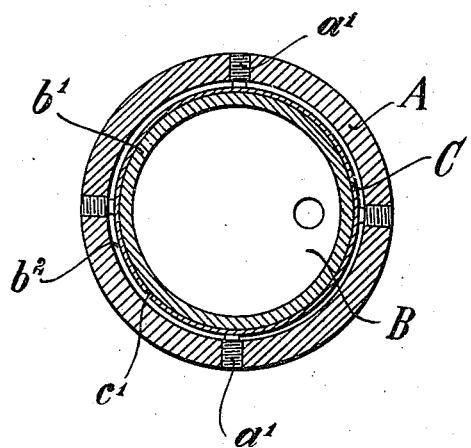

Figure 1 is a longitudinal section through the fuse-housing; and Fig. 2 is a section on the line 2 2, Fig. 1.

With the timing-cap A engage the holding-screws $a'$, which have flattened inner ends to lie against a ring C, preferably made of resilient metal, such as brass or steel. The ring C can turn loosely on the bottom of a groove $b^2$, cut into the cylindrical trunnion or seat $b'$ of the fuse-body B. The ring is split at $c'$, Fig. 2, to permit it to be introduced in the groove $b^2$. The width of the ring C corresponds to the width of the groove $b^2$, so as to prevent axial movement of the ring in the groove. The ring is provided with a flange $c^2$, against which the inner ends of the screws $a'$ lie and which prevents axial movement of the cap A on the trunnion $b'$.

When the screws $a'$ are tightened, the ring acts as a means to impart pressure from the screws to the fuse-body by distributing their pressure on the entire bottom of the groove $b^2$, thereby preventing the timing-cap packing or permanently binding against the fuse-body. When the cap A is rotated, the ring C is carried along by the screws $a'$ and slides on the bottom of the groove $b^2$.

In the embodiment shown in the drawings the timing-cap surrounds the fuse-body B; but it is evident that the arrangement might be reversed so as to have the fuse-body surrounding the timing-cap. In such case the holding-screws $a'$ would be screwed into the fuse-body B and the ring C would lie in a groove in the timing-cap A.

Having described my invention, what I claim as new, and desire to secure by Letters Patent, is—

1. In a fuse-housing, the combination with the fuse-body and the rotatable timing-cap, of screws arranged in one of said parts, and means arranged between the ends of the screws and the other part and adapted to impart pressure from the screws to the other part.

2. In a fuse-housing, the combination with the fuse-body and the rotatable timing-cap, of screws arranged in one of said parts, and a ring interposed between the ends of the screws and the other part.

3. In a fuse-housing, the combination with the fuse-body and the rotatable timing-cap, one of said parts having an annular groove therein, of a resilient ring in said groove, and screws arranged in the other part and bearing against said ring.

The foregoing specification signed at Dusseldorf this 20th day of June, 1906.

KARL WIESER.

In presence of—
     WILLIAM ESSENWEIN,
     ALFR. POHLMEYER.